US010749374B2

United States Patent
Okada et al.

(10) Patent No.: US 10,749,374 B2
(45) Date of Patent: Aug. 18, 2020

(54) ELECTRIC POWER SUPPLY DEVICE, METHOD FOR SUPPLYING ELECTRIC POWER, AND POWER STORAGE DEVICE

(71) Applicant: MURATA MANUFACTURING CO., LTD., Kyoto (JP)

(72) Inventors: Masami Okada, Fukushima (JP); Atsushi Minami, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 134 days.

(21) Appl. No.: 16/110,380

(22) Filed: Aug. 23, 2018

(65) Prior Publication Data
US 2019/0020218 A1    Jan. 17, 2019

Related U.S. Application Data

(63) Continuation of application No. PCT/JP2017/014792, filed on Apr. 11, 2017.

(30) Foreign Application Priority Data

May 18, 2016  (JP) .................. 2016-099795

(51) Int. Cl.
*H02J 9/06* (2006.01)
*H02J 3/38* (2006.01)
*H02J 7/00* (2006.01)
*H02J 7/34* (2006.01)
*H02J 3/32* (2006.01)
*H02J 7/35* (2006.01)

(52) U.S. Cl.
CPC ............... *H02J 9/061* (2013.01); *H02J 3/32* (2013.01); *H02J 3/38* (2013.01); *H02J 7/00* (2013.01);
(Continued)

(58) Field of Classification Search
CPC ...... H02J 9/061; H02J 3/32; H02J 3/38; H02J 7/00; H02J 7/0063; H02J 7/0068;
(Continued)

(56) References Cited

U.S. PATENT DOCUMENTS

2011/0140649 A1*  6/2011  Choi .................. H01M 14/005
                                                                      320/101
2011/0148205 A1   6/2011  Moon

FOREIGN PATENT DOCUMENTS

JP        03-142512       6/1991
JP        2011-010412 A   1/2011
(Continued)

OTHER PUBLICATIONS

International Search Report and Written Opinion issued in connection with International Patent Application No. PCT/JP2017/014792, dated May 16, 2017. (7 pages).
(Continued)

*Primary Examiner* — Carlos Amaya
(74) *Attorney, Agent, or Firm* — K&L Gates LLP (57) ABSTRACT

An electric power supply device including: a first interposed between an electric power system and a predetermined load; a power storage system having a secondary battery, a first charging and discharging unit interposed between the secondary battery and the electric power system, and a second charging and discharging unit interposed between the secondary battery and the predetermined load; and a controller configured to control the first switch, the first charging and discharging unit, and the second charging and discharging unit, in which when system abnormality occurs, the controller causes the switch to open to disconnect between the electric power system and the predetermined load, causes the first charging and discharging unit to perform reverse power flow for a prescribed time, and causes the second charging and discharging unit to supply electric power to the predetermined load.

9 Claims, 8 Drawing Sheets

(52) U.S. Cl.
CPC .......... *H02J 7/0063* (2013.01); *H02J 7/0068* (2013.01); *H02J 7/34* (2013.01); *H02J 7/35* (2013.01); *H02J 9/06* (2013.01); *H02J 3/381* (2013.01); *H02J 2007/0067* (2013.01); *Y02B 10/72* (2013.01)

(58) Field of Classification Search
CPC ........ H02J 7/34; H02J 7/35; H02J 9/06; H02J 3/381; H02J 2007/0067; Y02B 10/72
See application file for complete search history.

(56) References Cited

FOREIGN PATENT DOCUMENTS

| | | |
|---|---|---|
| JP | 2011-139594 | 7/2011 |
| JP | 2014-180153 A | 9/2014 |
| JP | 2014-209464 | 11/2014 |
| JP | 2015-186291 A | 10/2015 |
| JP | 2016-021851 | 2/2016 |
| WO | 2014/141327 A1 | 9/2014 |

OTHER PUBLICATIONS

Extended European Search Report dated Aug. 5, 2019 in corresponding European Application No. 17799077.7.
Japanese Office Action dated Sep. 3, 2019 in corresponding Japanese Application No. 2018-518157.
Japanese Office Action dated Apr. 28, 2020 in corresponding Japanese Application No. 2018-518157.

\* cited by examiner

ELECTRIC POWER SUPPLY DEVICE, METHOD FOR SUPPLYING ELECTRIC POWER, AND POWER STORAGE DEVICE

CROSS REFERENCE TO RELATED APPLICATIONS

The present application is a continuation of PCT patent application no. PCT/JP2017/014792, filed on Apr. 11, 2017, which claims priority to Japanese patent application no. JP2016-099795 filed on May 18, 2016, the entire contents of which are being incorporated herein by reference.

BACKGROUND

The present technology generally relates to an electric power supply device, a method for supplying electric power, and a power storage device, in system interconnection.

Technologies for connecting power generation facilities that generate electricity using natural energy such as solar power generation and wind power generation to an electric power system of an electric power company are generally referred to as system interconnection. When system interconnection is performed, quality similar to that of electric power supplied by an electric power company is required. Thus, when voltage generated by solar power generation or wind power generation becomes overvoltage or undervoltage, or a frequency rises or falls, this adversely affects quality of the entire system of the power company. When these troubles are detected, the corresponding power generation facility needs to be immediately disconnected from the system. Disconnection is called parallel off. In addition, there is also known a power supply system in which generated electric power is temporarily stored in a power storage system and the electric power is supplied to a load from the power storage system.

For example, when a power failure or the like occurs, power supply is switched to a self-sustaining state in which electric power is supplied to a predetermined load from the power storage system without using a system power source.

SUMMARY

The present technology generally relates to an electric power supply device, a method for supplying electric power, and a power storage device, in system interconnection.

In recent years, there is gradually emphasized not only that power supply is switched to supply electric power to a predetermined load from a power storage system when a power failure occurs, but also operation continuous performance FRT (fault ride through) during system disturbance. That is, when introduction of dispersed power source is expanded and a large number of dispersed power sources is interconnected to an electric power system in a wide area, simultaneous parallel off causes large disturbance in the electric power system to cause voltage fluctuation and frequency fluctuation, thereby causing deterioration in power quality for other users.

To prevent this trouble, functions of the FRT tend to be defined. That is, "requirements for operation continuous performance of dispersed power sources during system disturbance necessary to secure electric power quality" (this is referred to as FRT requirements) has been studied and prepared. For example, it is defined to perform system interconnection for a predetermined time (e.g., about several minutes) in the case of voltage reduction in system electric power, instead of immediately being parallel off. To satisfy the FRT requirements, a power storage device for causing reverse power flow in a system needs to be provided along with a power storage device in independent operation. This causes an increase in capacity of a battery, an increase in circuit scale of a control circuit and the like, complication of control, and the like to cause a disadvantage in cost.

Thus, the present technology provides a power supply device, a method for supplying electric power, and a power storage device, capable of sharing a single power storage system for reverse power flow and independent operation.

According to an embodiment of the present technology, an electric power supply device including:

a first switch interposed between an electric power system and a predetermined load;

a power storage system having a secondary battery, a first charging and discharging unit interposed between the secondary battery and the electric power system, and a second charging and discharging unit interposed between the secondary battery and the predetermined load; and a controller configured to control the first switch, the first charging and discharging unit, and the second charging and discharging unit, in which when the controller causes the first switch to open to disconnect between the electric power system and the predetermined load, causes the first charging and discharging unit to perform reverse power flow for a prescribed time, and causes the second charging and discharging unit to supply electric power to the predetermined load when system abnormality occurs.

According to another embodiment of the present technology, a method for supplying electric power of an electric power supply device including a first switch interposed between an electric power system and a predetermined load; a power storage system having a secondary battery, a first charging and discharging unit interposed between the secondary battery and the electric power system, and a second charging and discharging unit interposed between the secondary battery and the predetermined load; and a controller configured to control the first switch, the first charging and discharging unit, and the second charging and discharging unit, the method including the steps of:

when system abnormality occurs, opening the first switch to disconnect between the electric power system and the predetermined load; causing the first charging and discharging unit to perform reverse power flow for a prescribed time; and causing the second charging and discharging unit to supply electric power to the predetermined load.

According to an embodiment of the present technology, a power storage device is provided. The power storage device includes:

a secondary battery; a first charging and discharging unit and a second charging and discharging unit both connected to the secondary battery;

a controller configured to cause a state of each of the first charging and discharging unit and the second charging and discharging unit to be one of a charging operation, a discharging operation, and a charging and discharging stopping state; and a first electric power input-output unit connected to the first charging and discharging unit and a second electric power input-output unit connected to the second charging and discharging unit.

According to another embodiment of the present technology, an electronic apparatus is provided and the electronic apparatus to which electric power is supplied by the power storage device described herein.

According to at least one embodiment, a single power storage system can not only supply electric power to a predetermined load in an uninterrupted manner when a system abnormality occurs, but also satisfy the FRT requirements. It should be understood that the effects described herein are not necessarily limited, and other suitable properties relating to the present technology may be realized and as further described.

DETAILED DESCRIPTION

The present technology generally relates to an electric power supply device, a method for supplying electric power, and a power storage device, in system interconnection. As described herein, the present disclosure will be described based on examples with reference to the drawings, but the present disclosure is not to be considered limited to the examples, and various numerical values and materials in the examples are considered by way of example.

Figure 1:
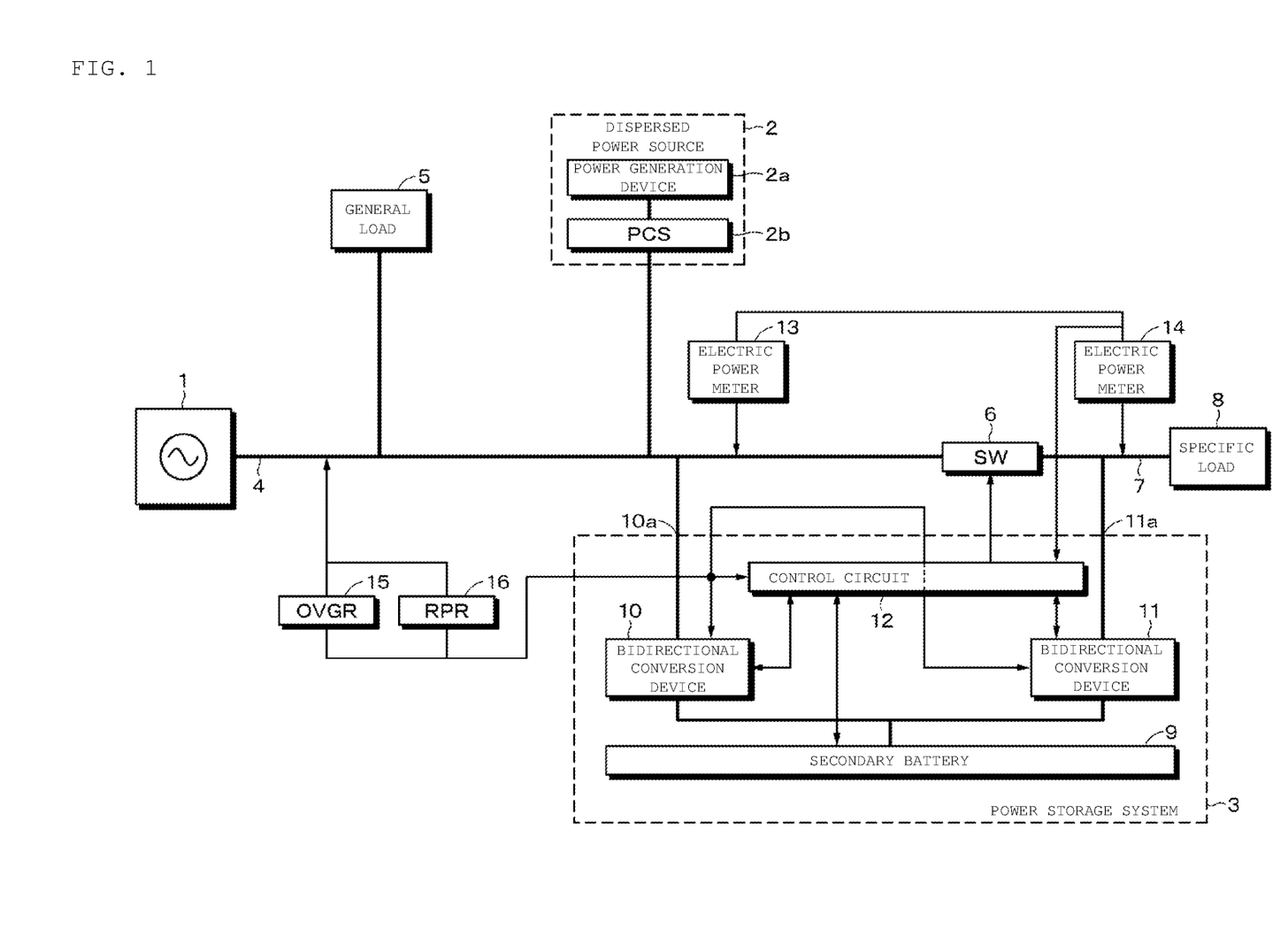
FIG. 1 is a block diagram according to an embodiment of the present technology.

As illustrated in FIG. 1, a power source supply system according to a first embodiment of the present technology includes a system power source 1, a dispersed power source 2, and a power storage system 3. The system power source 1 is provided by a power company. The dispersed power source 2 includes a power generation device 2a using natural energy such as sunlight, and a power conditioner (PCS) 2b.

The dispersed power source 2 such as solar cell device, a general load 5, and a switch 6 are connected to an electric power line 4 that is connected to the system power source 1 and wired. An electric power line 7 extending from the switch 6 is connected to a specific load 8. The switch 6 disconnects or connects power transmission between the electric power line 4 and the electric power line 7. The specific load 8 is a predetermined load required to supply electric power in an uninterrupted manner in a power failure. The general load 5 is a load to which power does not need to be supplied in a power failure. The definition of the term, "uninterrupted", is not limited to a complete momentary interruption, and a momentary interruption in about several milliseconds is also defined as uninterrupted.

The power storage system 3 includes a secondary battery 9, a first bidirectional conversion device 10, a second bidirectional conversion device 11, and a control circuit 12 (controller). The secondary battery 9 has a number of battery cells connected in series and/or in parallel. As the battery cell, a lithium ion secondary battery is used, for example. A rechargeable battery cell other than the lithium ion secondary battery may be used. The control circuit 12 including a processor may be provided in each of the bidirectional conversion devices 10 and 11. In this case, the bidirectional conversion devices 10 and 11 communicate with each other.

The bidirectional conversion devices 10 and 11 share the configuration of each of the charging circuit and the discharging circuit for the secondary battery 9. Instead of the bidirectional conversion device, a configuration in which a separate charge circuit and discharge circuit are connected in parallel may be used. The bidirectional conversion device 10 includes an electric power input-output unit 10a connected to the electric power line 4. The bidirectional conversion device 11 includes an electric power input-output unit 11a connected to the electric power line 7.

The control circuit 12 controls the secondary battery 9, the bidirectional conversion devices 10 and 11, and the switch 6. The bidirectional conversion devices 10 and 11 are controlled by the control circuit 12 for any one of a charging operation, a discharging operation, and a charge/discharge stopping state. The bidirectional conversion device 10 and the bidirectional conversion device 11 each may have a different state.

The electric power line 4 is connected to an electric power meter 13, and the electric power line 7 is connected to an electric power meter 14. The electric power meter 13 measures electric power in the electric power line 4 to detect whether or not predetermined power is provided in the electric power line 4. The electric power meter 14 detects whether or not predetermined power is provided in the electric power line 7. That is, the electric power meters 13 and 14 detect abnormality of the system power source. The abnormality of the system power source may be detected by measuring voltage, electric current, frequency, or the like. Detection results of the electric power meters 13 and 14 are supplied to the control circuit 12. The bidirectional conversion devices 10 and 11 may detect system abnormality. In addition, the switch 6 may detect abnormality of the system, and may control its switching by itself according to a detection result. In this case, the control circuit detects that the switch 6 is turned off, and the operation at the time of system abnormality is performed.

The electric power line 4 is connected to a ground over voltage relay (OVGR) 15 and a reverse power flow relay (RPR) 16. The OVGR 15 monitors whether the system is normal or abnormal. The RPR 16 does not allow a reverse flow from the secondary battery 9, and thus monitors such that there is no reverse flow from the secondary battery 9. The OVGR 15 and the RPR 16 each supply a detection signal to the control circuit 12.

Operation to be performed under control of the control circuit 12 according to the first embodiment described above will be described. First, processing when a system abnormality (voltage reduction, frequency abnormality, etc.) occurs during discharging will be described with reference to the flowchart of FIG. 2.

Figure 2:
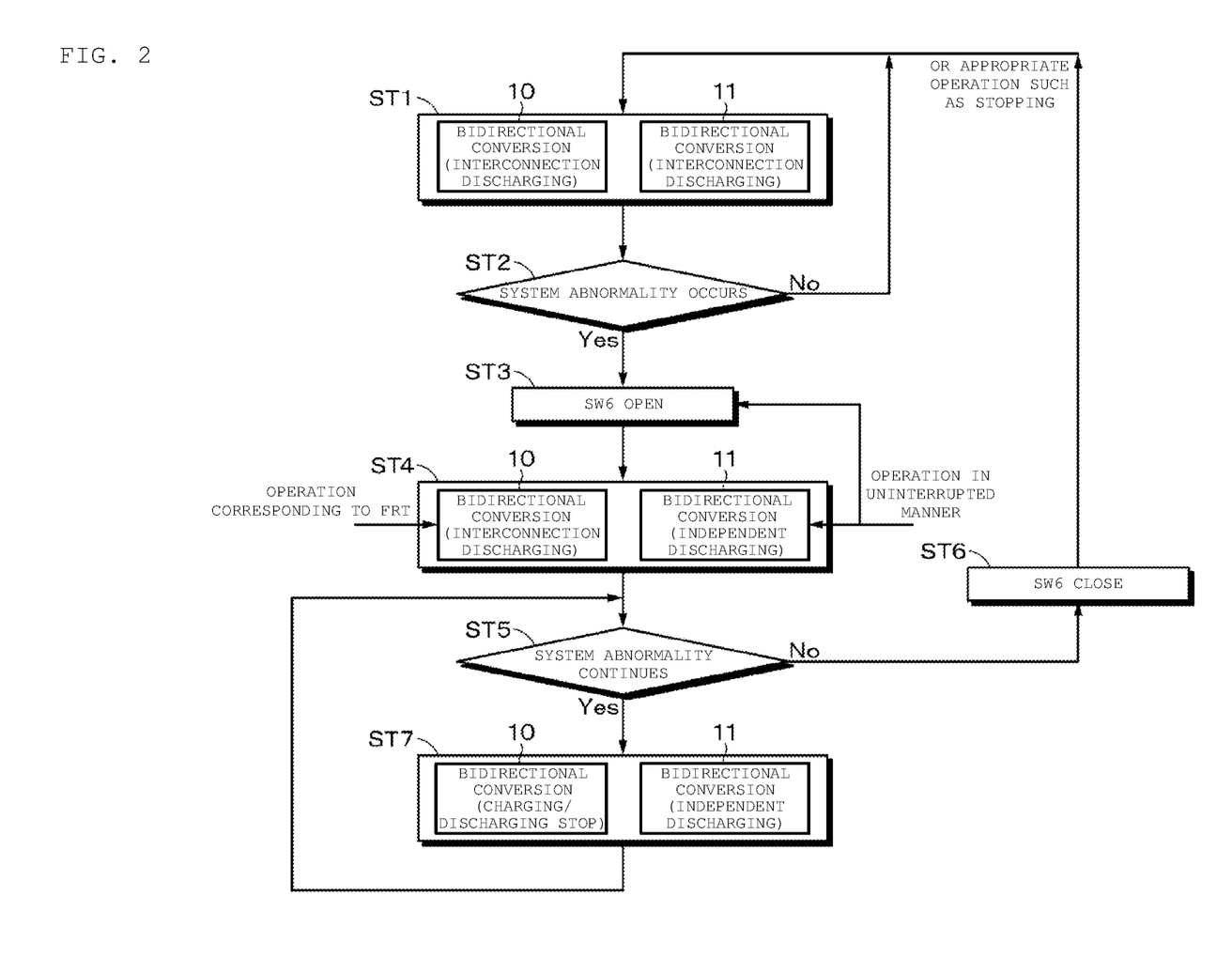
FIG. 2 is a flowchart used for illustrating operation of an embodiment of the present technology.

Step ST1: The secondary battery 9 is discharged with the bidirectional conversion devices 10 and 11 (operation of interconnection discharging). In this state, the switch 6 is closed (ON).

Step ST2: The electric power meter 13 monitors whether or not system abnormality occurs.

Step ST3: When occurrence of system abnormality is detected, the switch 6 is opened (OFF) by the control circuit 12 in an uninterrupted manner.

Step ST4: The one bidirectional conversion device 10 performs an interconnection discharging operation even after the system abnormality is detected, and performs an operation corresponding to the FRT. For example, the bidirectional conversion device 10 continues power supply to the electric power line 4 for a predetermined time. The other bidirectional conversion device 11 supplies electric power to the specific load 8 using independent discharging through the electric power line 7. As described above, the independent discharging and the operation corresponding to the FRT can be performed at the same time.

Step ST5: It is determined whether or not the system abnormality continues.

Step ST6: When it is determined that the system abnormality does not continue, the switch 6 is closed. Then, the processing returns to step ST1 (interconnection discharging). Instead of closing the switch 6, an appropriate operation such as stopping control may be performed.

Step ST7: When it is determined in step ST5 that the system abnormality continues, the bidirectional conversion device 10 is set to a charging and discharging stopping state, and the bidirectional conversion device 11 continues the independent discharging.

Next, processing when a system abnormality (voltage reduction, frequency abnormality, etc.) occurs during charging will be described with reference to the flowchart of FIG. 3.

Step ST11: The secondary battery 9 is being charged through the bidirectional conversion devices 10 and 11 (operation of interconnection charging). In this state, the switch 6 is closed (ON).

Step ST12: The electric power meter 13 monitors whether or not system abnormality occurs.

Step ST13: When occurrence of system abnormality is detected, the switch 6 is opened (OFF) by the control circuit 12 in an uninterrupted manner.

Step ST14: The one bidirectional conversion device 10 stops charging and discharging. The other bidirectional conversion device 11 supplies electric power to the specific load 8 using independent discharging through the electric power line 7. Electric power is supplied to the specific load 8 in an uninterrupted manner. Instead of stopping charging and discharging, an operation corresponding to the FRT may be performed.

Step ST15: It is determined whether or not the system abnormality continues.

Step ST16: When it is determined that the system abnormality does not continue, the switch 6 is closed. Then, the processing returns to step ST11 (interconnection charging). Instead of closing the switch 6, an appropriate operation such as stopping control may be performed.

Step ST17: When it is determined in step ST15 that the system abnormality continues, the bidirectional conversion device 10 continues the charging and discharging stopping state, and the bidirectional conversion device 11 continues the independent discharging.

Next, processing when a system abnormality (voltage reduction, frequency abnormality, etc.) occurs during stop of charging and discharging will be described with reference to the flowchart of FIG. 4.

Step ST21: The bidirectional conversion devices 10 and 11 each are in the charging and discharging stopping state. In this state, the switch 6 is closed (ON).

Step ST22: The electric power meter 13 monitors whether or not system abnormality occurs.

Step ST23: When occurrence of system abnormality is detected, the switch 6 is opened (OFF) by the control circuit 12 in an uninterrupted manner.

Step ST24: The one bidirectional conversion device 10 stops charging and discharging. The other bidirectional conversion device 11 supplies electric power to the specific load 8 using independent discharging through the electric power line 7. Electric power is supplied to the specific load 8 in an uninterrupted manner.

Step ST25: It is determined whether or not the system abnormality continues.

Step ST26: When it is determined that the system abnormality does not continue, the switch 6 is closed. Then, the processing returns to step ST21 (interconnection charging). Instead of closing the switch 6, an appropriate operation such as stopping control may be performed.

Step ST27: When it is determined in step ST25 that the system abnormality continues, the bidirectional conversion device 10 continues the charging and discharging stopping state, and the bidirectional conversion device 11 continues the independent discharging.

Figure 3:
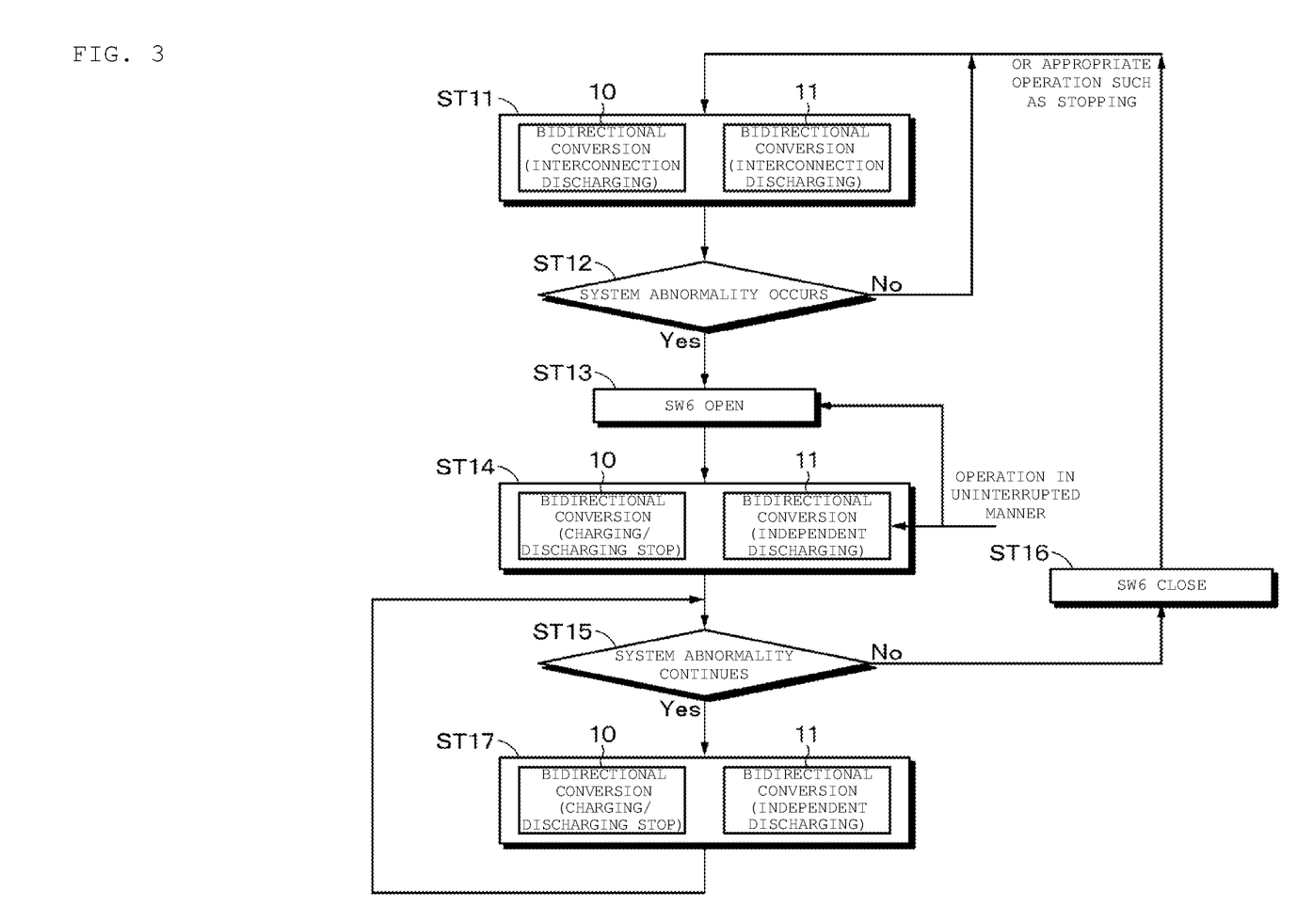
FIG. 3 is a flowchart used for illustrating operation of an embodiment of the present technology.
Figure 4:
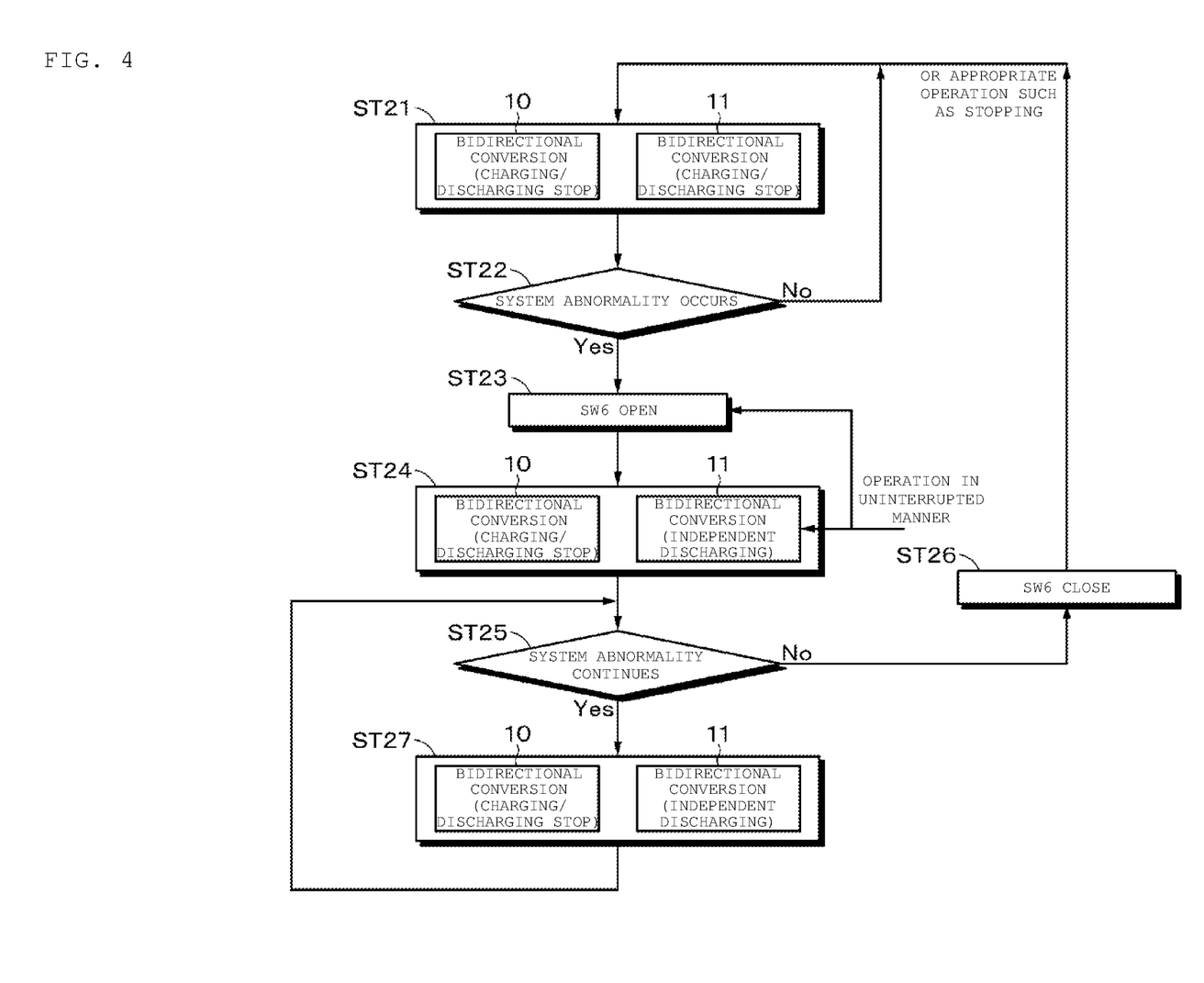
FIG. 4 is a flowchart used for illustrating operation of an embodiment of the present technology.
Figure 5A:
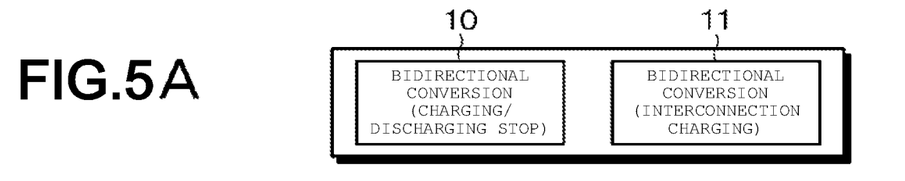
FIGS. 5A-5D are schematic drawings used for illustrating operation of an embodiment of the present technology.

The bidirectional conversion device 10 and the bidirectional conversion device 11 are independently controlled, and thus each may have states of FIGS. 5A to 5D other than the states in FIG. 2 (during discharging), FIG. 3 (during charging), and FIG. 4 (during stop of charging and discharging). FIG. 5A illustrates the bidirectional conversion device 10 in the charging and discharging stopping state, and the bidirectional conversion device 11 in an interconnection charging state. In this case, the same processing as in FIG. 4 is performed.

Figure 5B:
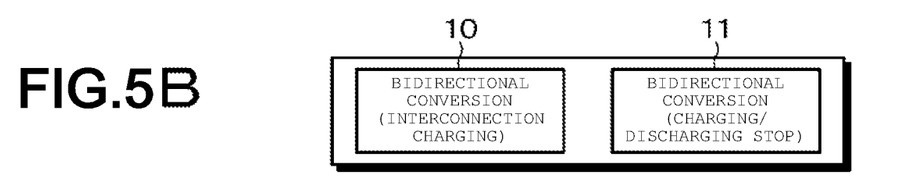
Figure 5C:
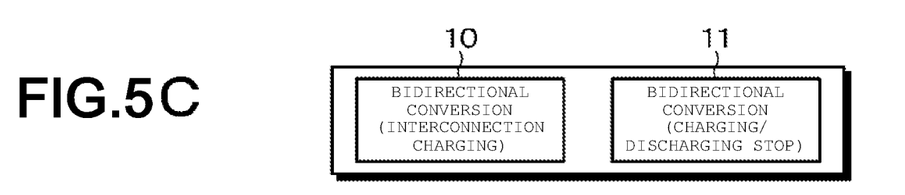
Figure 5D:
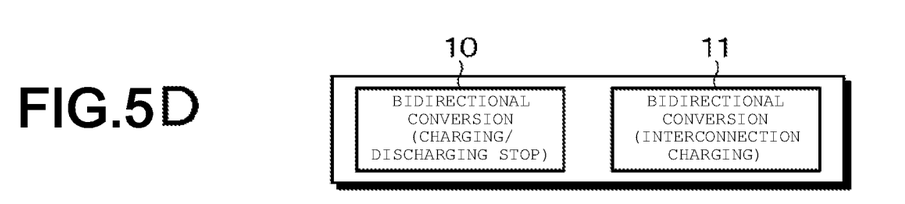

FIG. 5B illustrates the bidirectional conversion device 10 in the interconnection charging state, and the bidirectional conversion device 11 in the charging and discharging stopping state. In this case, the same processing as in FIG. 3 is performed. FIG. 5C illustrates the bidirectional conversion device 10 in an interconnection discharging state, and the bidirectional conversion device 11 in the charging and discharging stopping state. In this case, the same processing as in FIG. 2 is performed. FIG. 5D illustrates the bidirectional conversion device 10 in the charging and discharging stopping state, and the bidirectional conversion device 11 in the interconnection discharging state. In this case, the same processing as in FIG. 4 is performed.

Figure 6:
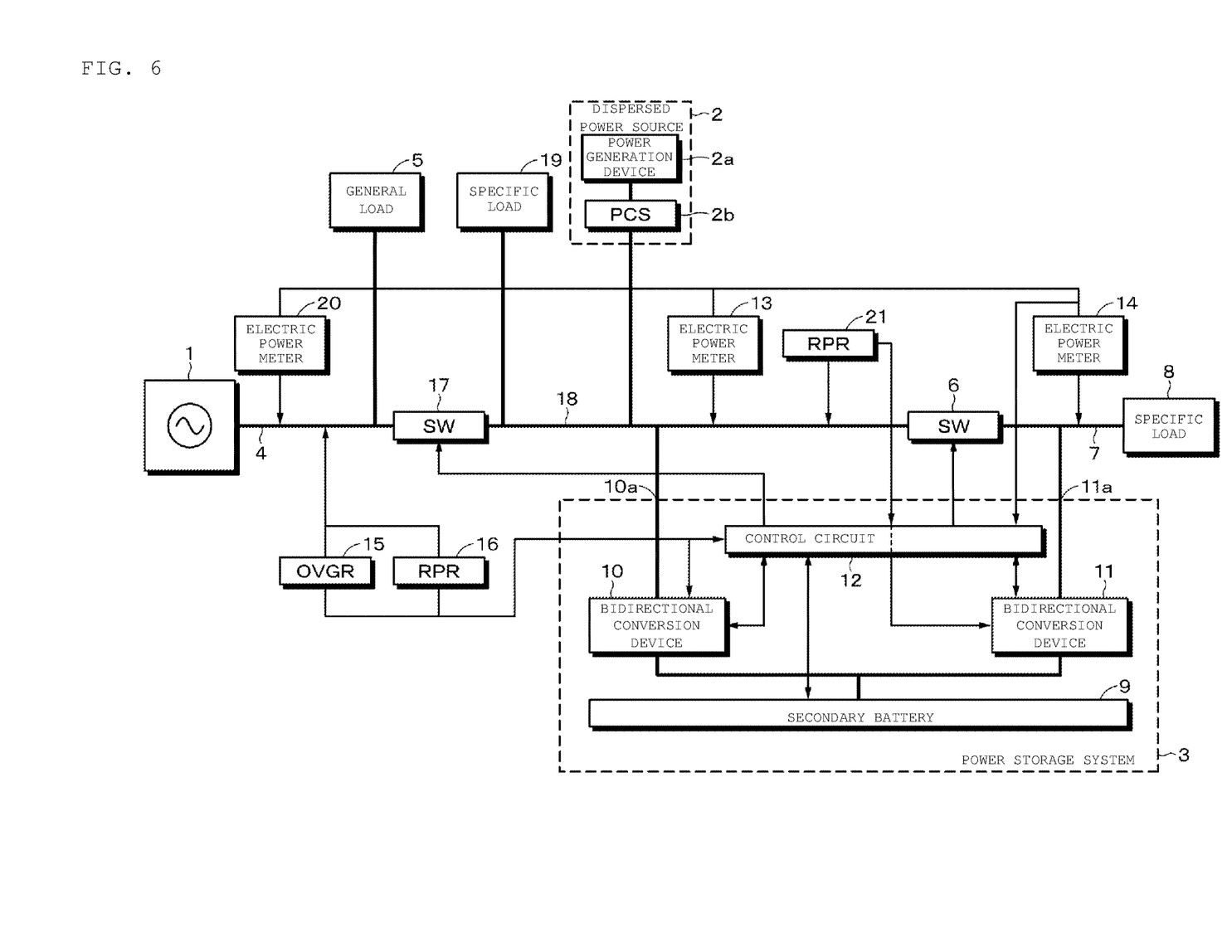
FIG. 6 is a block diagram according to an embodiment of the present technology.

With reference to FIG. 6, a second embodiment of the present technology will be described. Components corresponding to those of the first embodiment (FIG. 1) are denoted by the same reference numerals. A power source supply system according to the second embodiment includes a system power source 1, a dispersed power source 2, and a power storage system 3. The system power source 1 is provided by a power company. The dispersed power source 2 includes a power generation device 2a using natural energy such as sunlight, and a power conditioner (PCS) 2b.

In the second embodiment, a switch 17 is added. That is, a general load 5 and the switch 17 are connected to an electric power line 4 that is connected to a system power source 1 and wired. An electric power line 18 extending from the switch 17 is connected to a switch 6. The switch 17 disconnects or connects power transmission between the electric power line 4 and the electric power line 18. The electric power line 18 is connected to the dispersed power source 2 and a specific load 19.

An electric power line 7 extending from the switch 6 is connected to a specific load 8. The switch 6 disconnects or connects power transmission between the electric power line 7 and the electric power line 18. The specific load 8 is a predetermined load required to supply electric power in an uninterrupted manner in a power failure. The specific load 19 may be instantaneously interrupted in a power failure, but is desired to continue operating. The general load 5 is a load to which power does not need to be supplied in a power failure.

The power storage system 3 includes a secondary battery 9, bidirectional conversion devices 10 and 11, and a control circuit 12 (controller). The secondary battery 9 has a number of battery cells connected in series and/or in parallel. As the battery cell, a lithium ion secondary battery is used, for example. A rechargeable battery cell other than the lithium ion secondary battery may be used.

The bidirectional conversion devices 10 and 11 share the configuration of each of the charging circuit and the discharging circuit for the secondary battery 9. Instead of the bidirectional conversion device, a configuration in which a separate charge circuit and discharge circuit are connected in parallel may be used. The bidirectional conversion device 10 is connected to the electric power line 18, and the bidirectional conversion device 11 is connected to the electric power line 7.

The control circuit 12 including a processor controls the secondary battery 9, the bidirectional conversion devices 10 and 11, and the switches 6 and 17. The bidirectional conversion devices 10 and 11 are controlled by the control circuit 12 for any one of a charging operation, a discharging operation, and a charge/discharge stopping state.

The electric power line 4 is connected to an electric power meter 20, the electric power line 18 is connected to an electric power meter 13, and the electric power line 7 is connected to an electric power meter 14. The electric power meter 20 measures electric power in the electric power line 4 to detect whether or not predetermined power is provided in the electric power line 4. The electric power meters 13 and 14 detect whether or not predetermined power is provided in the electric power lines 18 and 7, respectively, that is, abnormality of the system power source. The abnormality of the system power source may be detected by measuring voltage or electric current. Detection results of the electric power meters 13, 14, and 20 are supplied to the control circuit 12.

The electric power line 4 is connected to a ground over voltage relay (OVGR) 15 and a reverse power flow relay (RPR) 16. The OVGR 15 monitors whether the system is normal or abnormal. The RPR 16 does not allow a reverse flow from the secondary battery 9, and thus monitors such that there is no reverse flow from the secondary battery 9. The OVGR 15 and the RPR 16 each supply a detection signal to the control circuit 12. The electric power line 18 is connected to an RPR 21. The RPR 21 is a device for monitoring a flow of electric current from the bidirectional conversion device 11 via the switch 6.

Figure 7:
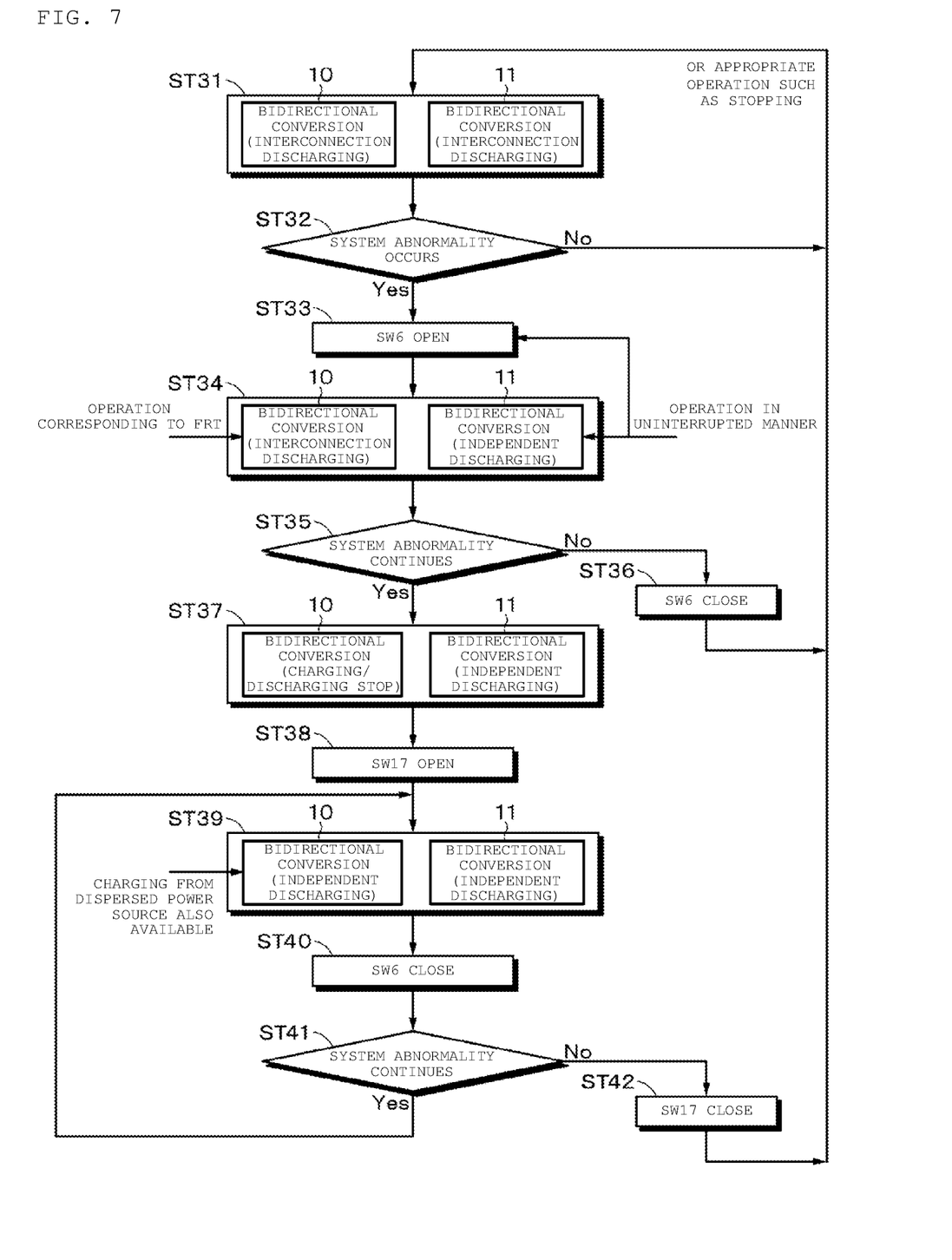
FIG. 7 is a flowchart used for illustrating operation of an embodiment of the present technology.

With reference to the flowchart of FIG. 7, operation of the first embodiment described above will be described. For example, processing when a system abnormality (voltage reduction, frequency abnormality, etc.) occurs during discharging will be described.

Step ST31: The secondary battery 9 is discharged with the bidirectional conversion devices 10 and 11 (operation of interconnection discharging is performed). In this state, the switches 6 and 18 are closed (ON).

Step ST32: The electric power meter 20 monitors whether or not system abnormality occurs.

Step ST33: When occurrence of system abnormality is detected, the switch 6 is opened (OFF) by the control circuit 12 in an uninterrupted manner. The switch 17 remains closed.

Step ST34: The one bidirectional conversion device 10 performs an interconnection discharging operation even after the system abnormality is detected, and performs an operation corresponding to the FRT. For example, the bidirectional conversion device 10 continues power supply to the electric power line 19 for a predetermined time. The other bidirectional conversion device 11 supplies electric power to the specific load 8 using independent discharging through the electric power line 7. As described above, the independent discharging and the operation corresponding to the FRT can be performed at the same time.

Step ST35: It is determined whether or not the system abnormality continues.

Step ST36: When it is determined that the system abnormality does not continue, the switch 6 is closed. Then, the processing returns to step ST31 (interconnection discharging). Instead of closing the switch 6, an appropriate operation such as stopping control may be performed.

Step ST37: When it is determined in step ST35 that the system abnormality continues, the bidirectional conversion device 10 is set to a charging and discharging stopping state, and the bidirectional conversion device 11 continues the independent discharging.

Step ST38: The switch 17 is opened. As a result, the electric power line 4 and the electric power line 18 are disconnected.

Step ST39: Both the bidirectional conversion devices 10 and 11 perform independent discharging. Electric power can be supplied to the specific loads 8 and 19. In this case, the secondary battery 9 can be also charged with the dispersed power source 2 and the bidirectional conversion device 10.

Step ST40: The switch 6 is closed.

Step ST41: It is determined whether or not the system abnormality continues. When it is determined in step ST41 that the system abnormality continues, the processing returns to step ST39.

Step ST42: When it is determined that the system abnormality does not continue, the switch 17 is closed. Then, the processing returns to step ST31 (interconnection discharging). Instead of closing the switch 17, an appropriate operation such as stopping control may be performed.

In the case where the bidirectional conversion device 10 supplies no electric power to the electric power line 18, the second embodiment described above enables electric power to be supplied to the specific loads 8 and 19 in an uninterrupted manner by opening the switch 6 and the switch 17 when a system abnormality occurs.

The second embodiment further has a function of preventing reverse power flow. To prevent discharge from the electric power line 18 to the system side by the bidirectional conversion device 11, the RPR 21 monitors reverse power flow. The bidirectional conversion device 11 is controlled so as to discharge electric power equal to or less than electric power consumption of the specific load 8 to prevent discharge to the system side through the switch 6. When load fluctuations cause discharge electric power of the bidirectional conversion device 11 to exceed power consumption of the specific load 8, the RPR 21 outputs a detection signal. This detection signal is input into the bidirectional conversion device 11. When receiving the detection signal, the bidirectional conversion device 11 immediately stops discharging. The control circuit 12 instructs again appropriate discharge electric power in accordance with the power consumption of the specific load 8 to cause the bidirectional conversion device 11 to resume discharging.

According to the embodiments of the present technology as described herein, one power storage system can constitute a power storage system for supplying electric power to a specific load in an uninterrupted manner when a system abnormality occurs, and a power storage system for causing reverse power flow to satisfy the FRT requirements. Thus, in comparison with a configuration in which separate power storage systems are provided for respective objects, capacity of a secondary battery, circuit scale of a control circuit and the like, can be reduced.

When having a general load of 100 kW, a specific load of 60 kW, and a maximum discharge rate of 1 C of a secondary battery, for example, a conventional system requires not only a secondary battery system of 200 kWh for a peak shift of the general load by two hours, but also a secondary battery system of 60 kWh for guaranteeing the specific load for ten minutes due to limitation of a maximum discharge rate of the secondary battery, and thus requires a total capacity of 260 kWh. In contrast, the present technology merely needs a secondary battery of 10 kWh for guaranteeing 60 kW for a specific load for ten minutes, and a secondary battery of 200 kWh for a general load, and thus a total of 210 kWh of storage batteries may be mounted.

Figure 8:
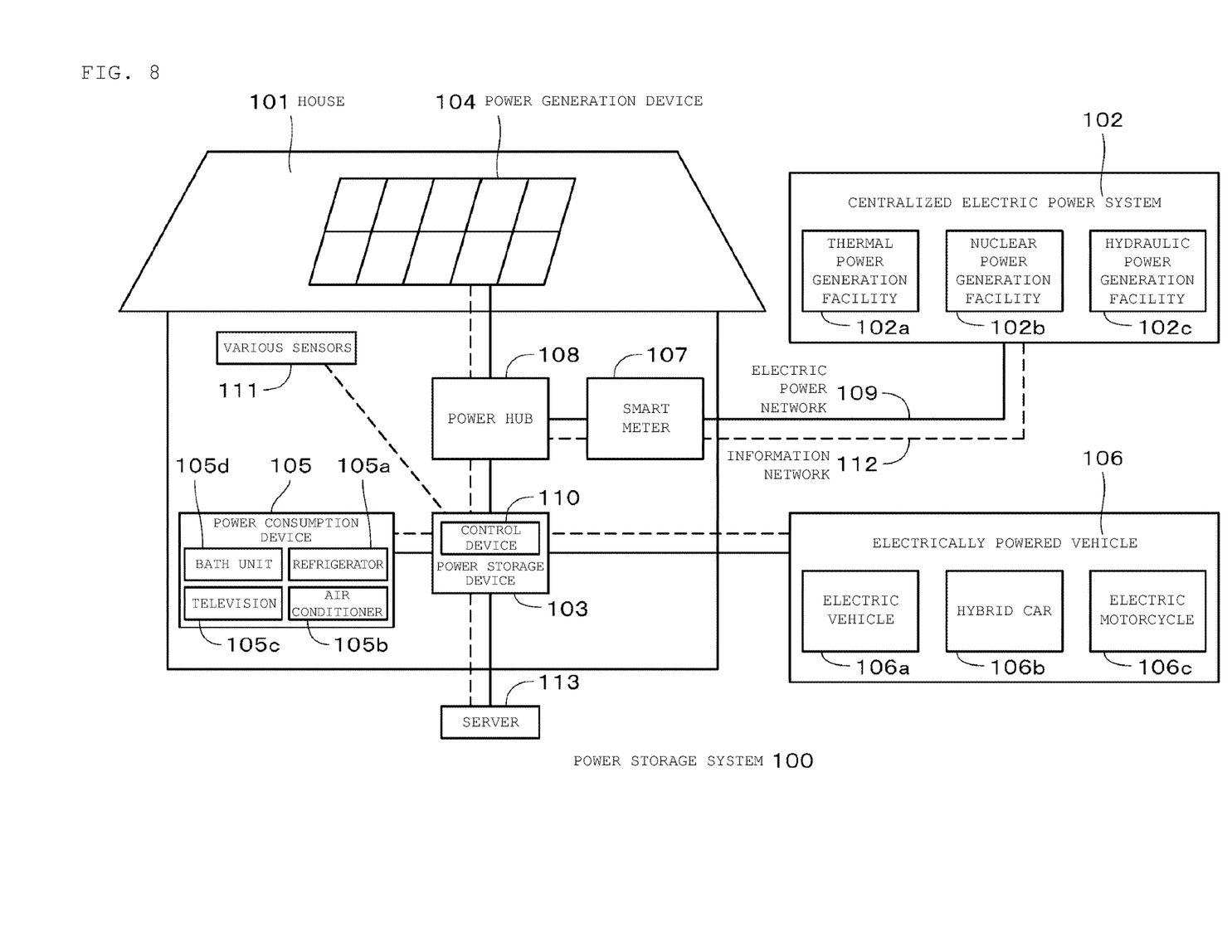
FIG. 8 is a schematic diagram illustrating a power storage system for a residential home according to an embodiment of the present technology.

With reference to FIG. 8, an example in which the power storage device using the battery of the present technology is applied to a power storage system for a house will be described. For example, a power storage system 100 for a house 101 includes a power storage device 103 to which electric power is supplied from a centralized electric power system 102 such as a thermal power generation facility 102a, a nuclear power generation facility 102b, a hydraulic power generation facility 102c, and the like, via an electric power network 109, an information network 112, a smart meter 107, a power hub 108, and the like. At the same time, electric power is supplied to the power storage device 103 from an independent power source such as a power generation device 104 in a household. The power storage device 103 stores electric power supplied. Electric power to be used in the house 101 is supplied using the power storage device 103. Besides the house 101, a similar power storage system can be used for a building.

The house 101 includes a power generation device 104, a power consumption device 105, a power storage device 103, a control device 110 for controlling each device, a smart meter 107, and sensors 111 for acquiring various information items. Each device is connected via the electric power network 109 and the information network 112. As the power generation device 104, a solar cell, a fuel cell, or the like is used, and generated power is supplied to the power consumption device 105 and/or the power storage device 103. The power consumption device 105 includes a refrigerator 105a, an air conditioner 105b, a television 105c that is a television receiver, a bath unit 105d, and the like. The electric power consumption device 105 also includes an electrically powered vehicle 106. The electrically powered vehicle 106 includes an electric vehicle 106a, a hybrid car 106b, and an electric motorcycle 106c.

The battery of the present technology is applied to the power storage device 103. The battery of the present technology may include a lithium ion secondary battery described above, for example. The smart meter 107 has a function of measuring the amount of usage of commercial power and transmitting the measured amount of usage to an electric power company. The electric power network 109 may be any one of DC power supply, AC power supply, and non-contact power supply, or a combination of them.

The various sensors 111 include a human sensor, an illuminance sensor, an object detection sensor, a power consumption sensor, a vibration sensor, a contact sensor, a temperature sensor, an infrared sensor, and the like, for example. Information acquired by the various sensors 111 is transmitted to the control device 110. Based on the information from the sensors 111, a state of the weather, a state of a person, and the like are grasped so that the power consumption device 105 is automatically controlled to enable energy consumption to be minimized. In addition, the control device 110 can transmit information on the house 101 to an external power company or the like via the Internet.

The power hub 108 performs processes such as branching of power lines and DC/AC conversion. Communication methods of the one-shot network 112 connected to the control device 110 include a method using a communication interface such as a universal asynchronous receiver-transmitter (UART) or transmission/reception circuit for asynchronous serial communication, and a method using a sensor network based on a wireless communication standard such as Bluetooth®, ZigBee®, and Wi-Fi. The Bluetooth® system is applied to multimedia communication to enable communication with one-to-many connection. The ZigBee uses a physical layer based on institute of electrical and electronics engineers (IEEE) 802.15.4. The IEEE 802.15.4 is a name of a short-range wireless network standard called a personal area network (PAN) or a wireless (W) PAN.

The control device 110 is connected to an external server 113. The server 113 may be managed by any of the house 101, an electric power company, or a service provider. The server 113 transmits and receives information including power consumption information, life pattern information, electric power charge, weather information, natural disaster information, and information on electric power trade, for example. These information items may be transmitted and received from a power consuming device (e.g., a television receiver) at home, or may be transmitted and received from a device outside a home (e.g., a mobile phone). These information items may be displayed on a device having a display function, such as a television receiver, a mobile phone, or a personal digital assistant (PDA).

The control device 110 that controls each unit may include a central processing unit (CPU) or a processor, a random access memory (RAM), a read only memory (ROM), or the like, and is stored in the power storage device 103 in this example. The control device 110 is connected to the power storage device 103, the power generation device 104 at home, the power consumption device 105, the various sensors 111, and the server 113 via the information network 112, and has a function of adjusting the amount of usage of commercial electric power, and the amount of power generation, for example. Besides, the control device 110 also may be provided with a function of conducting electric power trading in the electric power market.

As described above, the storage device 103 can store electric power generated by not only the centralized power system 102 such as the thermal power generation facility 102a, the nuclear power generation facility 102b, and the hydraulic power generation facility 102c, but also the power generation device 104 (of solar power generation or wind power generation) at home. This enables control of the constant amount of electric power to be transmitted to the outside, or of discharging as needed, even when generated power of the power generation device 104 at home fluctuates. For example, the power storage device 103 may be also used to store electric power obtained by solar power generation and midnight electric power with low power charge at night so that the electric power stored in the power storage device 103 is discharged in a time zone during daytime with high power charge.

While the control device 110 stored in the power storage device 103 is described in this example, it may be stored in the smart meter 107 or may be configured solely. In addition, the power storage system 100 may be used for a plurality of households in an apartment house, for a plurality of detached houses, or for a blocked area such as an improvement, or an office, other than a household.

Although one embodiment of the present technology is specifically described above, the present technology is not limited to the one embodiment described above, and various modifications based on the technical idea of the present technology are available. For example, the configurations, methods, processes, shapes, materials, numerical values, and the like, described in the above embodiments are merely examples, and thus different configurations, methods, processes, shapes, materials, numerical values, and the like are available if necessary.

The present technology is described below in further detail according to an embodiment.

(1)

An electric power supply device including:

a switch interposed between an electric power system and a predetermined load to which electric power needs to be supplied in an uninterrupted manner in a power failure;

a power storage system having a secondary battery, a first charging and discharging unit interposed between the secondary battery and the electric power system, and a second charging and discharging unit interposed between the secondary battery and the predetermined load; and a control unit configured to control the switch, the first charging and discharging unit, and the second charging and discharging unit, in which when system abnormality occurs, the control unit causes the switch to open to disconnect between the electric power system and the predetermined load, the first charging and discharging unit to cause reverse power flow for a prescribed time, and the second charging and discharging unit to supply electric power to the predetermined load.

(2)

The electric power supply device according to the configuration (1), in which the control unit controls each of the first charging and discharging unit and the second charging and discharging unit to be in a state of any one of discharging, charging, and charging/discharging stopping.

(3)

The electric power supply device according to the configuration (1) or (2), further including a reverse power flow monitoring device, in which the control unit controls discharge electric power of the second bidirectional conversion device to be equal to or less than power consumption of the predetermined load.

(4)

The electric power supply device according to any one of the configurations (1) to (3), further including a dispersed power source connected between the electric power system and the switch.

(5)

The electric power supply device according to any one of the configurations (1) to (4), in which when the system abnormality does not continue, the switch is closed, and when the system abnormality continues, the switch remains opened.

(6)

The electric power supply device according to any one of the configurations (1) to (5), further including another switch connected between the electric power system and the switch in series, and another load connected between the switch and the other switch, together with the first charging and discharging unit, in which when system abnormality occurs, the control unit causes the switch to open to disconnect between the electric power system and the predetermined load, the first charging and discharging unit to cause reverse power flow for a prescribed time, and the second charging and discharging unit to supply electric power to the predetermined load, when the system abnormality does not continue, the control unit causes the switch to close, and when the system abnormality continues, the control unit causes not only the switch to remain opened, but also the other switch to open from a closed state, and the first charging and discharging unit supplies electric power to the other load through the other switch.

(7)

The electric power supply device according to the configuration (6), further including a dispersed power source connected between the switch and the other switch, in which the dispersed power source charges the secondary battery through the first charging and discharging unit while the other switch is opened.

(8)

A method for supplying electric power of an electric power supply device including: a switch interposed between an electric power system and a predetermined load to which electric power needs to be supplied in an uninterrupted manner in a power failure; a power storage system having a secondary battery, a first charging and discharging unit interposed between the secondary battery and the electric power system, and a second charging and discharging unit interposed between the secondary battery and the predetermined load; and a control unit configured to control the switch, the first charging and discharging unit, and the second charging and discharging unit, the method including the steps of: when system abnormality occurs, opening the switch to disconnect between the electric power system and the predetermined load with the control unit; causing the first charging and discharging unit to perform reverse power flow for a prescribed time with the control unit; and causing the second charging and discharging unit to supply electric power to the predetermined load with the control unit.

(9)

A power storage device including:

a secondary battery;

a first charging and discharging unit, and a second charging and discharging unit, connected to the secondary battery;

a control unit configured to cause a state of each of the first charging and discharging unit, and the second charging and discharging unit, to be any one of a charging operation, a discharging operation, and a charging and discharging stopping state; and an electric power input-output unit connected to the first charging and discharging unit and an electric power input-output unit connected to the second charging and discharging unit.

(10)

An electronic apparatus to which electric power is supplied by the power storage device according to the configuration (9).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electric power supply device comprising:
a first switch interposed between an electric power system and a predetermined load;
a power storage system having a secondary battery, a first charging and discharging unit interposed between the secondary battery and the electric power system, and a second charging and discharging unit interposed between the secondary battery and the predetermined load; and
a controller configured to control the first switch, the first charging and discharging unit, and the second charging and discharging unit,
wherein the controller causes the first switch to open to disconnect between the electric power system and the predetermined load, causes the first charging and discharging unit to perform reverse power flow for a prescribed time, and causes the second charging and discharging unit to supply electric power to the predetermined load when system abnormality occurs.

2. The electric power supply device according to claim 1, wherein the controller is configured to control each of the first charging and discharging unit and the second charging and discharging unit to be in one of a discharging operation, a charging operation, and a charging and discharging stopping state.

3. The electric power supply device according to claim 1, further comprising a reverse power flow monitoring device, wherein the controller is configured to control discharge electric power of the second bidirectional conversion device to be equal to or less than power consumption of the predetermined load.

4. The electric power supply device according to claim 1, further comprising a dispersed power source connected between the electric power system and the first switch.

5. The electric power supply device according to claim 1, wherein when the system abnormality does not continue, the first switch is closed, and when the system abnormality continues, the first switch remains opened.

6. The electric power supply device according to claim 1, further comprising:
a second switch connected between the electric power system and the first switch; and
a load connected between the first switch and the second switch, together with the first charging and discharging unit,
wherein
when system abnormality occurs, the controller causes the first switch to open to disconnect between the electric power system and the predetermined load, causes the first charging and discharging unit to perform reverse power flow for a prescribed time, and causes the second charging and discharging unit to supply electric power to the predetermined load,
when the system abnormality does not continue, the controller causes the first switch to close, and
when the system abnormality continues, the controller causes the first switch to remain opened, and the second switch to open from a closed state, and the first charging and discharging unit supplies electric power to the load through the second switch.

7. The electric power supply device according to claim 6, further comprising a dispersed power source connected between the first switch and the second switch, wherein the dispersed power source is configured to charge the secondary battery through the first charging and discharging unit while the other switch is opened.

8. The electric power supply device according to claim 7, wherein the dispersed power source includes a solar cell device.

9. A method for supplying electric power of an electric power supply device including: a first switch interposed between an electric power system and a predetermined load; a power storage system having a secondary battery, a first charging and discharging unit interposed between the secondary battery and the electric power system, and a second charging and discharging unit interposed between the secondary battery and the predetermined load; and a controller configured to control the first switch, the first charging and discharging unit, and the second charging and discharging unit, the method comprising the steps of:
when system abnormality occurs, opening the first switch to disconnect between the electric power system and the predetermined load; causing the first charging and discharging unit to perform reverse power flow for a prescribed time; and causing the second charging and discharging unit to supply electric power to the predetermined load.

* * * * *